US012432395B2

(12) United States Patent
Rawal et al.

(10) Patent No.: US 12,432,395 B2
(45) Date of Patent: Sep. 30, 2025

(54) SERVER, METHOD AND USER TERMINAL

(71) Applicant: 17LIVE Japan Inc., Tokyo (JP)

(72) Inventors: Arun Rawal, Tokyo (JP); Hardik Taneja, Tokyo (JP); Kshitiz Yadav, Tokyo (JP); Abid Saudagar, Tokyo (JP)

(73) Assignee: 17LIVE JAPAN INC., Tokyo (JP)

( * ) Notice: Subject to any disclaimer, the term of this patent is extended or adjusted under 35 U.S.C. 154(b) by 51 days.

(21) Appl. No.: 18/581,581

(22) Filed: Feb. 20, 2024

(65) Prior Publication Data
US 2025/0150645 A1 May 8, 2025

(30) Foreign Application Priority Data
Nov. 2, 2023 (JP) ................ 2023-188470

(51) Int. Cl.
*H04N 21/2187* (2011.01)
*G06F 16/732* (2019.01)
*G06F 16/735* (2019.01)

(52) U.S. Cl.
CPC ....... *H04N 21/2187* (2013.01); *G06F 16/732* (2019.01); *G06F 16/735* (2019.01)

(58) Field of Classification Search
CPC .. H04N 21/2187; G06F 16/732; G06F 16/735
See application file for complete search history.

(56) References Cited

U.S. PATENT DOCUMENTS 10,721,513 B1 * 7/2020 Gupta ............... H04N 21/252
2013/0290999 A1 * 10/2013 Itakura ............ H04N 21/44222
725/14
2023/0328323 A1 * 10/2023 Jain .................... H04N 21/4668
725/14

FOREIGN PATENT DOCUMENTS

| JP | 2003-076704 A | 3/2003 |
|---|---|---|
| JP | 7272571 B1 | 5/2023 |
| JP | 7284909 B1 | 6/2023 |
| JP | 7316598 B1 | 7/2023 |
| JP | 7371844 B1 | 10/2023 |

OTHER PUBLICATIONS

Notice of Reasons for Refusal dated Jan. 9, 2024, issued in corresponding Japanese Patent Application No. 2023-188470 with English translation (8 pgs.).

* cited by examiner

*Primary Examiner* — Nicholas T Corbo
(74) *Attorney, Agent, or Firm* — Pillsbury Winthrop Shaw Pittman, LLP

(57) ABSTRACT

One object is to improve searches in livestreams. A server includes a circuitry, wherein the circuitry is configured to: hold, in a livestream information holding unit, information about livestreamers and viewers of livestreams performed on a livestreaming platform in a past; receive, by a request receiving unit, a search request from a user terminal of a first user of the livestreaming platform over a network; identify, in an identifying unit, a second user with reference to the livestream information holding unit, the second user being different from the first user and having viewed a livestream that the first user has viewed in a past; and generate, in a generating unit, a search result for the search request such that the second user or a livestream performed by the second user is presented by priority.

8 Claims, 11 Drawing Sheets

| Stream ID | Livestreamer ID | Viewer IDs | Starting Time | Ending Time | Livestream Content Tag | Image Data | Audio Data | Comment History |
|---|---|---|---|---|---|---|---|---|
| ST1 | USR1 | USR4(15min), USR3(13min), USR5(20min), ... | 2022/6/20 4:00 | 2022/6/20 5:00 | Guitar | ... | ... | 2:20 Good Guitarist ... |
| ST2 | USR2 | USR6(3min), USR7(18min), USR8(10min), ... | 2022/6/20 9:45 | 2022/6/20 11:30 | Chat | ... | ... | 1:30 I agree. ... |
| ST3 | USR3 | USR9(13min), ... | 2022/6/20 9:55 | NA | Game | ... | ... | 0:10 I will send you an item! ... |

| User ID | Points | Reward | Level | Age Range | Gender | Hair Color | Region | User Tag | Comment History | Self-introduction |
|---|---|---|---|---|---|---|---|---|---|---|
| USR1 | 3243 | 1500 | 45 | 21-30 | Female | Blonde | JP | Guitar | ... | ... |
| USR2 | 2510 | 800 | 7 | 31-40 | Male | Black | TW | Chat | ... | ... |
| USR3 | 1803 | 0 | 15 | 21-30 | Female | Brown | US | Game | ... | ... |
| USR4 | 520 | 0 | 0 | 41-50 | Male | Black | JP | Handsome | ... | ... |
| USR5 | 200 | 0 | 0 | 21-30 | Female | Black | JP | Chat | ... | ... |
| USR6 | 400 | 300 | 41 | 41-50 | Male | Black | TW | Animal | ... | ... |

| Gift ID | Reward To Be Awarded | Price Points |
|---|---|---|
| TT01 | 90 | 100 |
| TE01 | 180 | 200 |

SERVER, METHOD AND USER TERMINAL

CROSS-REFERENCE TO RELATED APPLICATIONS

This application is based on and claims the benefit of priority from Japanese Patent Application Serial No. 2023-184470 (filed on Nov. 2, 2023), the contents of which are hereby incorporated by reference in their entirety.

TECHNICAL FIELD

The present disclosure relates to a server, a method, and a user terminal.

BACKGROUND

With the development of IT technology, the way information is exchanged has changed. In the Showa period (1926-1989), one-way information communication via newspapers and television was the main stream. In the Heisei period (1990-2019), with the widespread availability of cell phones and personal computers, and the significant improvement in Internet communication speed, instantaneous interactive communication services such as chat services emerged, and on-demand video streaming services also became popular as storage costs were reduced. And nowadays or in the Reiwa period (2019 to present), with the sophistication of smartphones and further improvements in network speed as typified by 5G, services that enable real-time communication through video, especially livestreaming services, are gaining recognition. The number of users of livestreaming services is expanding, especially among young people, as such services allow people to share the same good time even when they are in the separate locations from each other.

Japanese Patent Nos. 7316598 and 7272571 disclose techniques that can improve searches for videos and livestreamers distributing the videos.

In a livestreaming platform, when a user delivers a livestream, the user is referred to as a livestreamer, and when the same user views a livestream delivered by another user, the user is referred to as a viewer. Typically, a livestream is viewed by a large number of viewers at the same time. These properties of livestreams can be successfully exploited to increase satisfaction with results of user searches and livestream searches.

SUMMARY

In view of above, one object of the disclosure is to provide a technology that can improve searches in livestreams.

One aspect of the disclosure relates to a server. The server comprises a circuitry, wherein the circuitry is configured to: hold, in a livestream information holding unit, information about livestreamers and viewers of livestreams performed on a livestreaming platform in a past; receive, by a request receiving unit, a search request from a user terminal of a first user of the livestreaming platform over a network; identify, in an identifying unit, a second user with reference to the livestream information holding unit, the second user being different from the first user and having viewed a livestream that the first user has viewed in a past; and generate, in a generating unit, a search result for the search request such that the second user or a livestream performed by the second user is presented by priority.

Another aspect of the disclosure relates to a method. The method is performed by a server comprising a circuitry, the circuitry being configured to hold, in a livestream information holding unit, information about livestreamers and viewers of livestreams performed on a livestreaming platform in a past. The method comprises: receiving a search request from a user terminal of a first user of the livestreaming platform over a network; identifying a second user with reference to the livestream information holding unit, the second user being different from the first user and having viewed a livestream that the first user has viewed in a past; and generating a search result for the search request such that the second user or a livestream performed by the second user is presented by priority. Still another aspect of the disclosure relates to a user terminal. The user terminal of a first user of a livestreaming platform comprises: one or more processors; and memory storing one or more computer programs configured to be executed by the one or more processors, the one or more computer programs including instructions for: transmitting a search request to a server over a network; receiving a search result for the search request from the server over the network; and causing the search result to be displayed on a display of the user terminal such that a second user or a livestream performed by the second user is shown by priority, the second user being different from the first user and having viewed a livestream that the first user has viewed in a past.

It should be noted that the components described throughout this disclosure may be interchanged or combined. The components, features, and expressions described above may be replaced by devices, methods, systems, computer programs, recording media containing computer programs, etc. Any such modifications are intended to be included within the spirit and scope of the present disclosure.

Advantageous Effects

The present disclosure can improve searches in livestreams.

BRIEF DESCRIPTION OF THE DRAWINGS

FIG. 4 is a data structure diagram showing an example of a stream DB in FIG. 3.

FIG. 5 is a data structure diagram showing an example of a user DB in FIG. 3.

FIG. 6 is a data structure diagram showing an example of a gift DB in FIG. 3.

DESCRIPTION OF THE PREFERRED EMBODIMENTS

Like elements, components, processes, and signals throughout the figures are labeled with same or similar designations and numbering, and the description for the like elements will not be hereunder repeated. For purposes of clarity and brevity, some of the components that are less related and thus not described are not shown in the figures.

In a livestreaming system according to an embodiment, a user performs a user search or a livestream search and, when the search result includes another user (hereinafter referred to as the "co-viewer" of the user) who has viewed a livestream that the user has viewed in the past, the co-viewer or the co-viewer's livestream is moved to a higher position in the search result. Since the user's co-viewer or his or her livestream can be placed at a more outstanding position in the search result presented to the user, it is easier for the user to find the co-viewer or his or her livestream. As a result, the click-through rate, or the percentage of clicks or taps on livestreamers or livestreams appearing in the search result, will increase, allowing livestreamers to have attention of more viewers.

Figure 7:
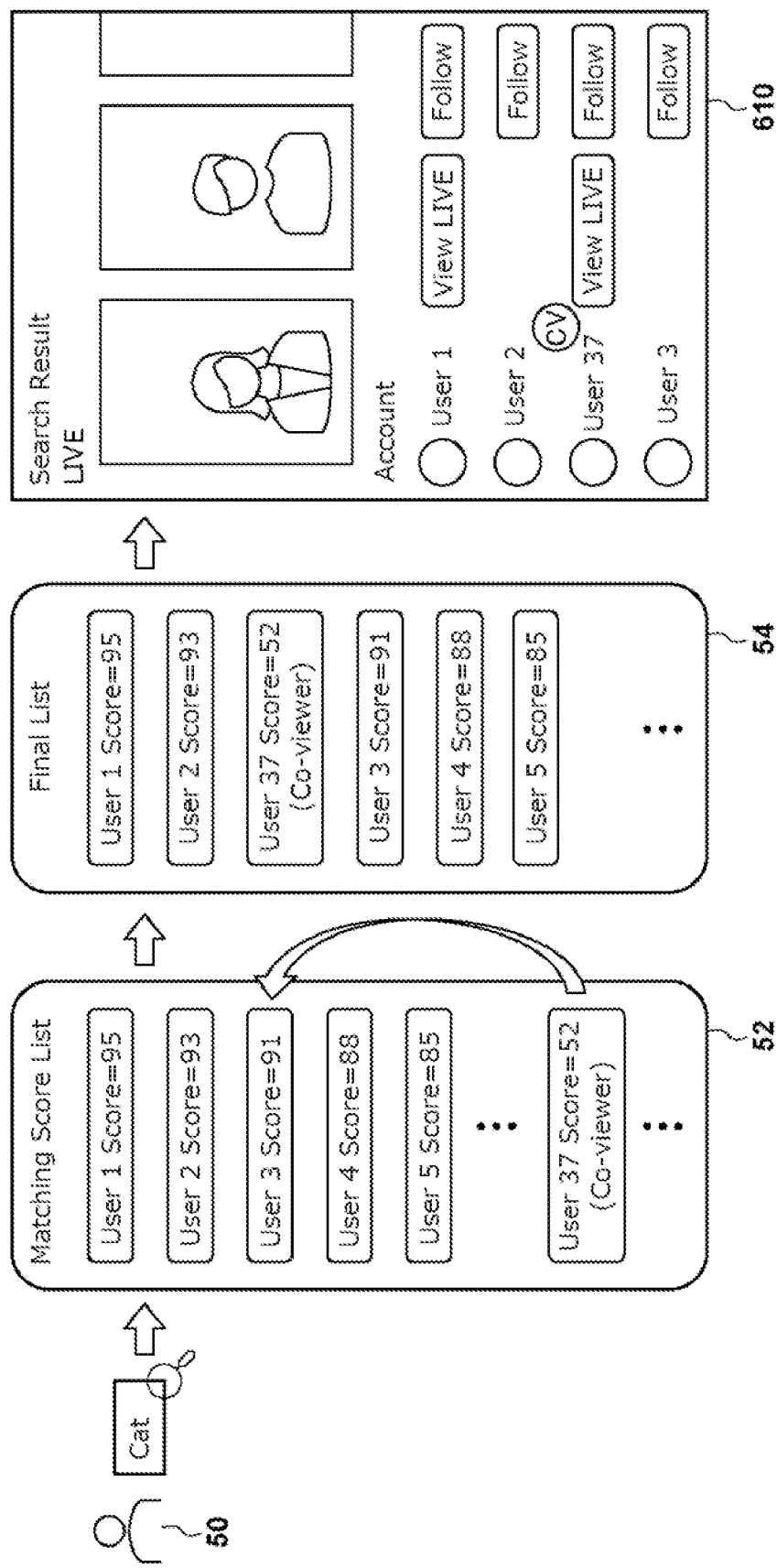
FIG. 7 is a schematic diagram showing a mechanism of user search according to an embodiment.

FIG. 7 is a schematic diagram showing a mechanism of user search according to an embodiment. Suppose a user 50 enters a key word "cat" and performs a user/livestream search. The server generates a matching score list 52, which is a result of a search by matching score. In the matching score list 52, the user IDs hit by the user search are arranged in the order of score. The server identifies a co-viewer ("user 37" in FIG. 7) of the user 50 who has requested the search, from among the user IDs included in the matching score list 52. The server moves the identified co-viewer to a predetermined position on the list. In the example in FIG. 7, the server moves the user 37, the 37th user on the matching score list 52, to the third position on the list, and lowers the positions of subsequent user IDs by one. As a result, the server generates a final list 54 that is the search result to be provided to the search requesting user. The final list 54 is transmitted to the user terminal of the user 50 who requested the search. This user terminal generates a search result display screen 610 based on the received final list 54 and displays it on the display. Since the co-viewer (user 37) is displayed at a high position in the search result display screen 610, the user 50 who requested the search is more likely to find the co-viewer.

In the final list 54 and the search result display screen 610, a co-viewer is shown in priority to users who are not co-viewers. For example, the user 37, who is a co-viewer, should be positioned lower than the user 3 and the user 4 according to the order of score, but is placed at a higher position than the user 3 and the user 4 because the user 37 is a co-viewer. Thus, the user 37 is shown in priority to the user 3 and the user 4. In addition, the position of the co-viewer in the final list 54 and the search result display screen 610 is higher than his or her position taken if he or she were not a co-viewer. For example, the user 37, who is a co-viewer, should be placed at the 37th position according to the order of score, but is placed at the third position because he or she is a co-viewer. Thus, the position (the third position) of the user 37 is higher than the position (the 37th position) of the user 37 taken if he or she were not a co-viewer. When a user searches for another user or a livestream, it is easier to find his or her peer who has previously watched the same livestream together and to find such peer's livestream. As a result, user satisfaction with the search result increases.

Figure 1:
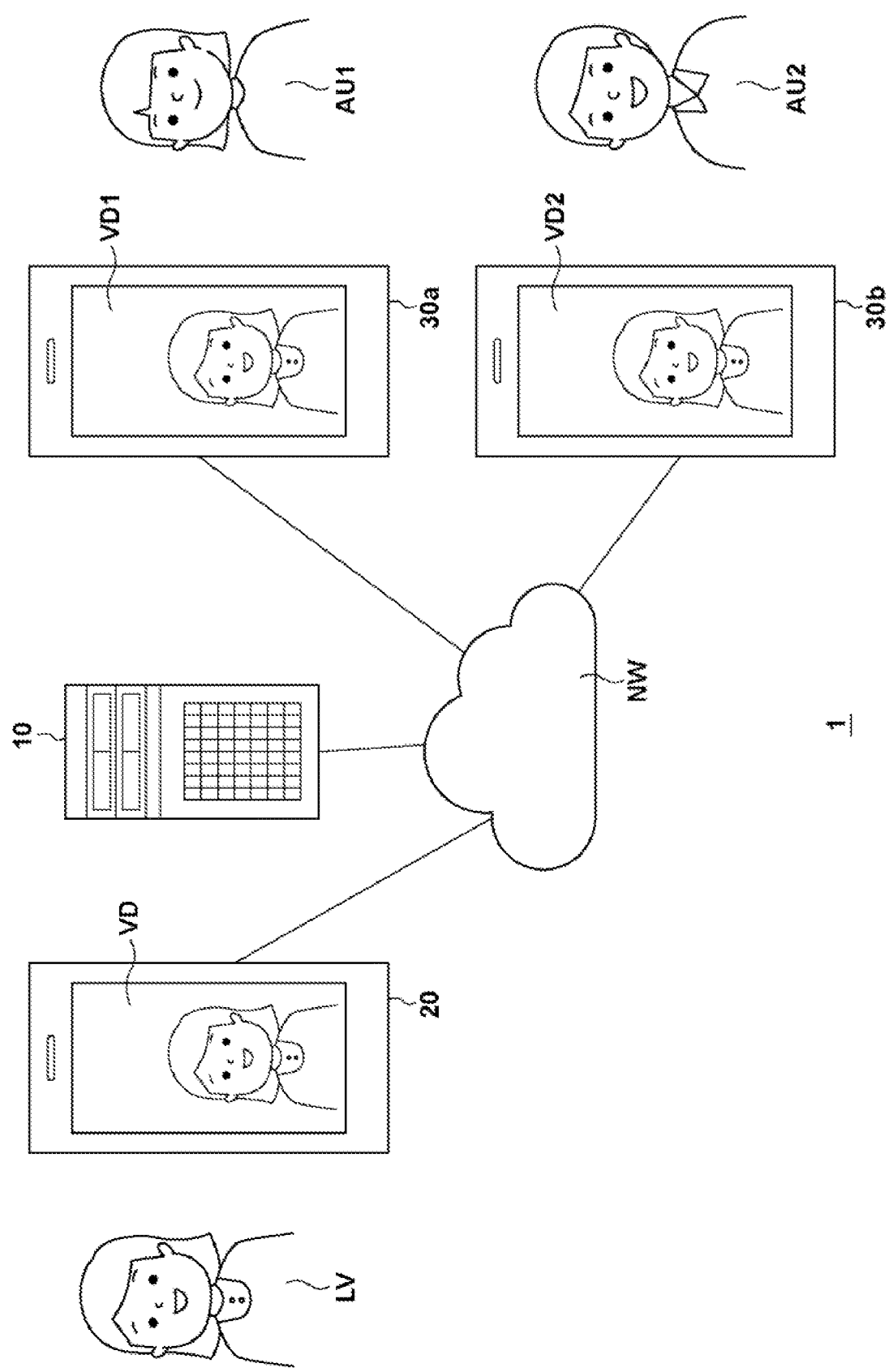
FIG. 1 schematically illustrates a configuration of a livestreaming system according to one embodiment of the disclosure.

FIG. 1 schematically illustrates the configuration of a livestreaming system 1 according one embodiment of the disclosure. The livestreaming system 1 provides an interactive livestreaming service that allows a livestreamer LV (also referred to as a liver or streamer) and viewers AU (also referred to as audience) (AU1, AU2, . . . ) to communicate in real time. As shown in FIG. 1, the livestreaming system 1 includes a server 10, a user terminal 20 on the livestreamer side, and user terminals 30 (30a, 30b, . . . ) on the viewer side. In addition to the livestreamers who are livestreaming and the viewers who are watching the livestreams, there may be users who have logged in to the livestreaming platform but are neither livestreaming nor watching the livestreams. Such users are herein referred to as active users. The livestreamers, the viewers, and the active users may be collectively referred to as users who use the livestreaming platform. The server 10 may be constituted by one or more information processing devices connected to a network NW. The user terminals 20 and 30 may be, for example, mobile terminal devices such as smartphones, tablets, laptop PCs, recorders, portable gaming devices, and wearable devices, or may be stationary devices such as desktop PCs. The server 10, the user terminal 20, and the user terminals 30 are interconnected so as to be able to communicate with each other over the various wired or wireless network NW.

The livestreaming system 1 involves the livestreamer LV, the viewers AU, and an administrator (not shown) who manages the server 10. The livestreamer LV is a person who broadcasts contents in real time by recording the contents with his/her user terminal 20 and uploading them directly to the server 1. Examples of the contents may include the livestreamer's own songs, talks, performances, fortune-telling, gameplays, and any other contents. The administrator provides a platform for livestreaming contents on the server 10, and also mediates or manages real-time interactions between the livestreamer LV and the viewers AU. The viewers AU access the platform through their user terminals 30 to select and view a desired content. During livestreaming of the selected content, the viewer AU performs operations to comment, cheer, or ask fortune-telling via the user terminal 30, the livestreamer LV who is delivering the content responds to such a comment, cheer, or request and such response is transmitted to the viewer AU via video and/or audio, thereby establishing an interactive communication.

As used herein, the term "livestreaming" or "livestream" may mean a mode of data transmission that allows a content recorded at the user terminal 20 of the livestreamer LV to be played and viewed at the user terminals 30 of the viewers AU substantially in real time, or it may mean a live broadcast realized by such a mode of transmission. The livestreaming may be achieved using existing livestreaming technologies such as HTTP Live Streaming, Common Media Application Format, Web Real-Time Communications, Real-Time Messaging Protocol and MPEG DASH. The livestreaming includes a transmission mode in which, while the livestreamer LV is recording contents, the viewers AU can view the contents with a certain delay. The delay is acceptable as long as interaction between the livestreamer LV and the viewers AU can be at least established. Note that the livestreaming is distinguished from so-called on-demand distribution, in which contents are entirely recorded and the entire data is once stored on the server and the server provides users with the data at any subsequent time upon request from the users.

The term "video data" herein refers to data that includes image data (also referred to as moving image data) generated using an image capturing function of the user terminals 20 and 30 and audio data generated using an audio input function of the user terminals 20 and 30. Video data is played back on the user terminals 20 and 30, so that the users can view contents. In this embodiment, it is assumed that between video data generation at the livestreamer's user terminal and video data reproduction at the viewer's user terminal, processing is performed onto the video data to change its format, size, or specifications of the data, such as compression, decompression, encoding, decoding, or transcoding. However, such processing does not substantially change the content (e.g., video images and audios) represented by the video data, so that the video data after such processing is herein described as the same as the video data before such processing. In other words, when video data is generated at the livestreamer's user terminal, transmitted via the server 10, and then reproduced at the viewer's user terminal, the video data generated at the livestreamer's user terminal, the video data that passes through the server 10, and the video data received and reproduced at the viewer's user terminal are all the same video data.

As used herein, "view duration" is a parameter associated with a pair of a viewer and a livestreamer and refers to the length of time during which the viewer has viewed a livestream of the livestreamer.

In the example in FIG. 1, the livestreamer LV is livestreaming his/her talk. The user terminal 20 of the livestreamer LV generates video data by recording images and sounds of the livestreamer LV who is talking, and the generated video data is transmitted to the server 10 over the network NW. At the same time, the user terminal 20 displays the recorded video image VD of the livestreamer LV on the display of the user terminal 20 to allow the livestreamer LV to check the livestream currently performed.

The respective user terminals 30a and 30b of the viewers AU1 and AU2, who have requested the platform to enable them to view the livestream of the livestreamer LV, receive video data related to the livestream over the network NW and reproduce the received video data, to display video images VD1 and VD2 on the displays and output audio through the speakers. The video images VD1 and VD2 displayed at the user terminals 30a and 30b, respectively, are substantially the same as the video image VD captured by the user terminal 20 of the livestreamer LV, and the audio outputted at the user terminals 30a and 30b is substantially the same as the audio recorded by the user terminal 20 of the livestreamer LV.

Recording of the images and sounds at the user terminal 20 of the livestreamer LV and reproduction of the video data at the user terminals 30a and 30b of the viewers AU1 and AU2 are performed substantially simultaneously. The viewer AU1 may type a comment about the talk of the livestreamer LV on the user terminal 30a, and the server 10 may display the comment on the user terminal 20 of the livestreamer LV in real time and also display the comment on the user terminals 30a and 30b of the viewers AU1 and AU2, respectively. The livestreamer LV may read the comment and develop his/her talk to cover and respond to the comment, and the video and sound of the talk are output on the user terminals 30a and 30b of the viewers AU1 and AU2, respectively. This interactive action is recognized as establishment of a conversation between the livestreamer LV and the viewer AU1. In this way, the livestreaming system 1 realizes a livestream that enables the interactive communication, not one-way communication. The viewer AU1 is a co-viewer of the viewer AU2 through the livestream of the livestreamer LV, and vice versa.

Figure 2:
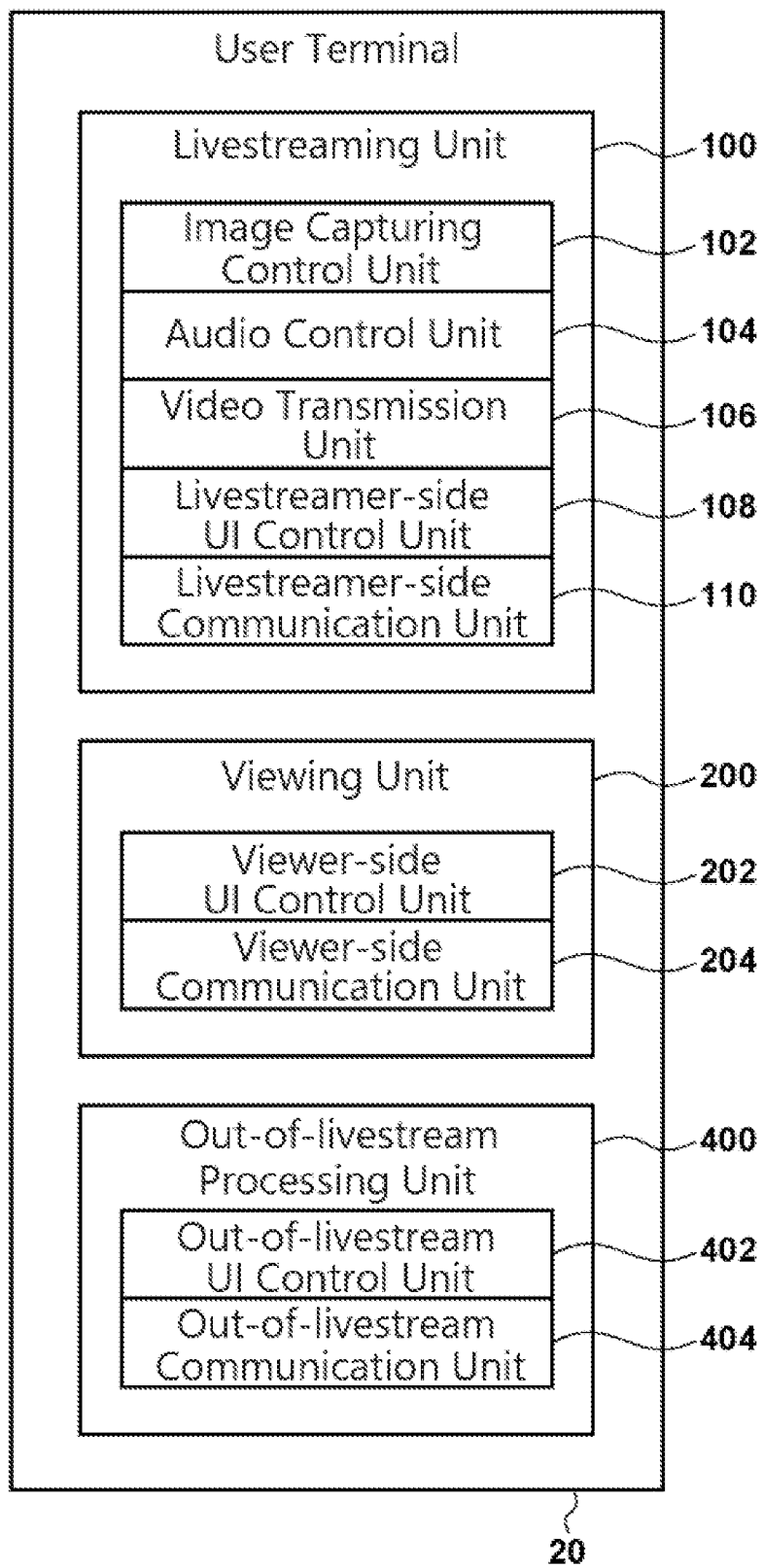
FIG. 2 is a block diagram showing functions and configuration of a user terminal in FIG. 1.

FIG. 2 is a block diagram showing functions and configuration of the user terminal 20 of FIG. 1. The user terminals 30 have the same functions and configuration as the user terminal 20. The blocks in FIG. 2 and the subsequent block diagrams may be realized by elements such as a computer CPU or a mechanical device in terms of hardware, and can be realized by a computer program or the like in terms of software. The blocks shown in the drawings are, however, functional blocks realized by cooperative operation between hardware and software. Therefore, it is understood by those skilled in the art that these functional blocks can be realized in various forms by combining hardware and software.

The livestreamer LV and the viewers AU download and install a livestreaming application program (hereinafter referred to as a livestreaming application), onto the user terminals 20 and 30 from a download site over the network NW. Alternatively, the livestreaming application may be pre-installed on the user terminals 20 and 30. When the livestreaming application is executed on the user terminals 20 and 30, the user terminals 20 and 30 communicate with the server 10 over the network NW to implement various functions. Hereinafter, the functions implemented by (processors such as CPUs of) the user terminals 20 and 30 running the livestreaming application will be described as functions of the user terminals 20 and 30. These functions are realized in practice by the livestreaming application on the user terminals 20 and 30. In any other embodiments, these functions may be realized by a computer program written in a programming language such as HTML (HyperText Markup Language), which is transmitted from the server 10 to web browsers of the user terminals 20 and 30 over the network NW and executed by the web browsers.

The user terminal 20 includes a livestreaming unit 100 for recording the user's image and sound to generate and provide video data to the server 10, a viewing unit 200 for acquiring and reproducing the video data from the server 10, and an out-of-livestream processing unit 400 for processing requests made by active users. The user activates the livestreaming unit 100 to deliver a livestream, the viewing unit 200 to view a livestream, and the out-of-livestream processing unit 400 to search for a livestreamer or livestream of interest, view a livestreamer's profile, or watch an archive. The user terminal having the livestreaming unit 100 activated is the livestreamer's terminal, i.e., the user terminal that generates video data, the user terminal having the viewing unit 200 activated is the viewer's terminal, i.e., the user terminal that reproduces video data, and the user terminal having the out-of-livestream processing unit 400 activated is the active user's terminal.

The livestreaming unit 100 includes an image capturing control unit 102, an audio control unit 104, a video transmission unit 106, a livestreamer-side UI control unit 108, and a livestreamer-side communication unit 110. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time.

The livestreamer-side UI control unit 108 controls the UI for the livestreamer. The livestreamer-side UI control unit 108 is connected to a display (not shown in FIG. 2), and displays a video on the display by reproducing the video data that is to be transmitted by the video transmission unit 106. The livestreamer-side UI control unit 108 is connected to input means (not shown in FIG. 2) such as touch panels, keyboards, and displays, and obtains the livestreamer's input via the input means. The livestreamer-side UI control unit 108 superimposes a predetermined frame image on the video image. The frame image includes various user interface objects (hereinafter simply referred to as "objects") for receiving inputs from the livestreamer, comments entered by the viewers, and information obtained from the server 10. The livestreamer-side UI control unit 108 receives, for example, the livestreamer's inputs made by the livestreamer tapping the objects.

The livestreamer-side communication unit 110 controls communication with the server 10 during a livestream. The livestreamer-side communication unit 110 transmits the content of the livestreamer's input that has been obtained by the livestreamer-side UI control unit 108 to the server 10 over the network NW. The livestreamer-side communication unit 110 receives various information associated with the livestream from the server 10 over the network NW.

The viewing unit 200 includes a viewer-side UI control unit 202 and a viewer-side communication unit 204. The viewer-side communication unit 204 controls communication with the server 10 during a livestream. The viewer-side communication unit 204 receives, from the server 10 over the network NW, video data related to the livestream in which the livestreamer and the viewer participate.

The viewer-side UI control unit 202 controls the UI for the viewer. The viewer-side UI control unit 202 is connected to a display and a speaker (not shown in FIG. 2), and reproduces the received video data so that the video images are displayed on the display and the sounds are output through the speaker. The state where the images and sounds are respectively output through the display and speaker can be referred to as "the video data is reproduced". The viewer-side UI control unit 202 is also connected to input means (not shown in FIG. 2) such as touch panels, keyboards, and displays, and obtains the viewer's input via the input means. The viewer-side UI control unit 202 superimposes a predetermined frame image on an image generated from the video data obtained from the server 10. The frame image includes various objects for receiving inputs from the viewer, comments entered by the viewer, and information obtained from the server 10. The viewer-side communication unit 204 transmits the content of the viewer's input that has been obtained by the viewer-side UI control unit 202 to the server 10 over the network NW.

The out-of-livestream processing unit 400 includes an out-of-livestream UI control unit 402 and an out-of-livestream communication unit 404. The out-of-livestream UI control unit 402 controls a UI for the active user. For example, the out-of-livestream UI control unit 402 generates a livestream selection screen and shows the screen on the display. The livestream selection screen presents a list of livestreams to which the active user is currently invited to participate to allow the active user to select a livestream. The out-of-livestream UI control unit 402 generates a profile screen for any user and shows the screen on the display. The out-of-livestream UI control unit 402 generates a search screen for enabling an input of a search keyword to be used in a search for a user and a livestream and shows the screen on the display. The out-of-livestream UI control unit 402 generates a search result display screen including results of the search for the user and the livestream and shows the screen on the display. The out-of-livestream UI control unit 402 plays back an archive generated by recording past livestreams.

The out-of-livestream communication unit 404 controls communication with the server 10 that takes place outside a livestream. The out-of-livestream communication unit 404 receives, from the server 10 over the network NW, information necessary to generate the livestream selection screen, results of searches for livestreamers, information necessary to generate the profile screen, and archived data. The out-of-livestream communication unit 404 transmits the content of the active user's input to the server 10 over the network NW.

Figure 3:
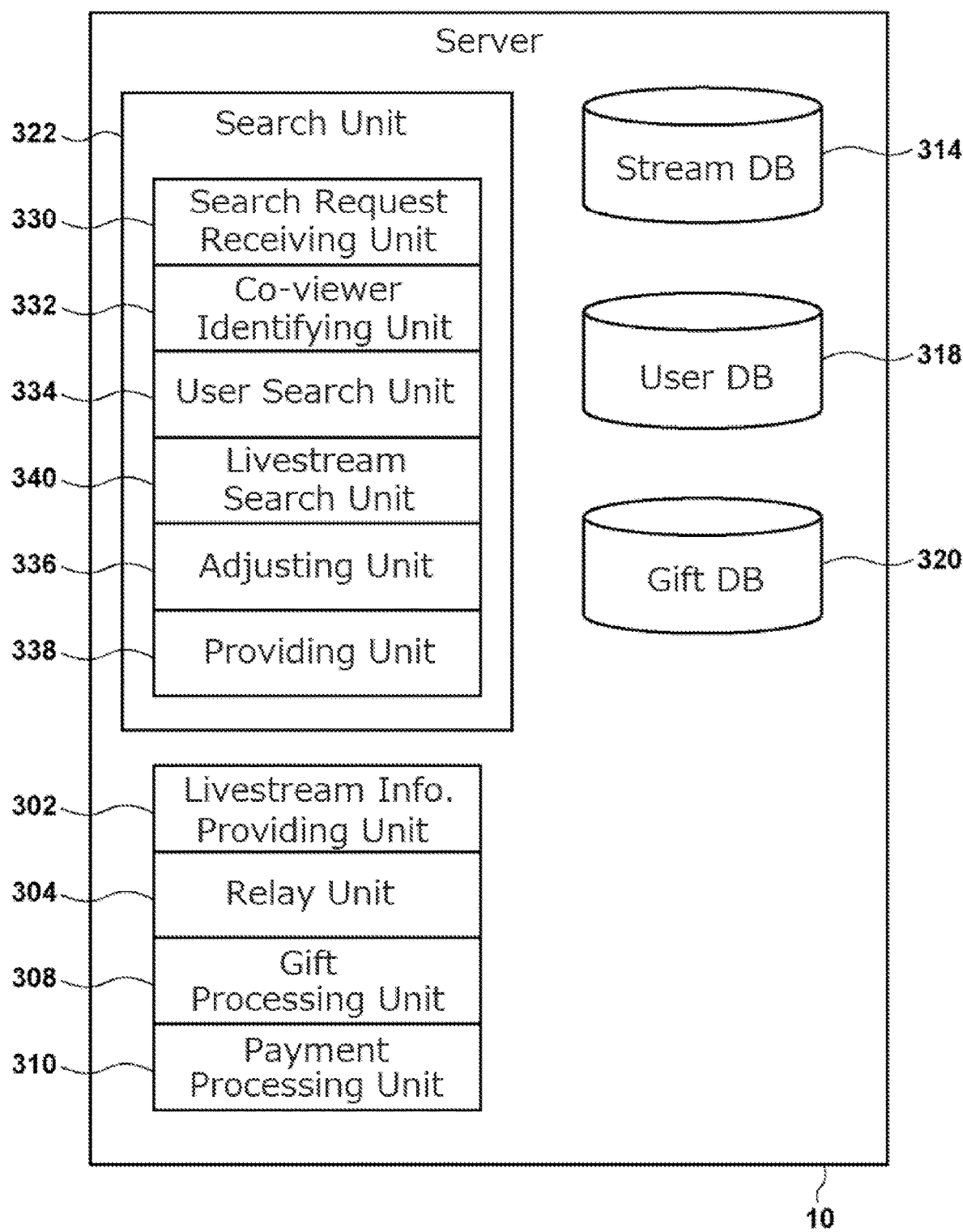
FIG. 3 is a block diagram showing functions and configuration of a server in FIG. 1.

FIG. 3 is a block diagram showing functions and configuration of the server 10 of FIG. 1. The server 10 includes a livestream information providing unit 302, a relay unit 304, a gift processing unit 308, a payment processing unit 310, a stream DB 314, a user DB 318, a gift DB 320, and a search unit 322.

FIG. 4 is a data structure diagram showing an example of the stream DB 314 of FIG. 3. The stream DB 314 holds information regarding livestreams currently taking place and information regarding livestreams that have taken place in the past (archived livestreams). In particular, the stream DB 314 holds information about livestreamers and viewers of livestreams that have taken place on the livestreaming platform in the past. The stream DB 314 stores a stream ID for identifying a livestream on a livestreaming platform provided by the livestreaming system 1, a livestreamer ID, which is a user ID for identifying the livestreamer who delivers the livestream, viewer IDs, which are user IDs for identifying viewers of the livestream, starting time of the livestream, ending time of the (archived) livestream, a livestream content tag indicating the content of the livestream, image data of the livestream, audio data of the livestream, and a history of comments posted in the livestream, in association with each other. Each of the viewer IDs is held along with the view duration of the viewer identified by that viewer ID.

In the livestreaming platform provided by the livestreaming system 1 of the embodiment, when a user delivers a livestream, the user is referred to as a livestreamer, and when the same user views a livestream delivered by another user, the user is referred to as a viewer. Therefore, the distinction between a livestreamer and a viewer is not fixed, and a user ID registered as a livestreamer ID at one time may be registered as a viewer ID at another time.

The content tag of a livestream may be designated by the livestreamer when starting the livestream or obtained from real-time analysis of the livestream by a machine learning model.

FIG. 5 is a data structure diagram showing an example of the user DB 318 of FIG. 3. The user DB 318 holds information regarding users. Specifically, the user DB 318 stores information on livestreamers distributing videos on the livestreaming platform. The user DB 318 includes a user ID identifying a user, the points the user has, the reward that has been granted to the user, the level of the user, the age range to which the user belongs, the gender of the user, the color of the user's hair, the region indicating the geographical region in which the user is using the livestreaming application, the user tag attached to the user, the history of comments posted by the user, and the introduction of the user.

The points are an electronic representation of value circulated in the livestreaming platform. The user can purchase the points using a credit card or other means of payment. The reward is an electronic representation of value defined in the livestreaming platform and is used to determine the amount of money the livestreamer receives from the administrator of the livestreaming platform. In the livestreaming platform, when a viewer gives a gift to a livestreamer within or outside a livestream, the viewer's points are consumed and, at the same time, the livestreamer's reward is increased by a corresponding amount.

The level is an indicator of the user's past performance as a livestreamer on the livestreaming platform. In other embodiments, the level may be an indicator of the user's past performance as a viewer on the livestreaming platform or it may be an indicator of the user's past performance as a livestreamer and as a viewer. The level may rise or drop depending on the number of livestreams delivered by the user, the duration of each livestream, the number and/or amount of gifts the user has given, the number and/or amount of gifts the user has received, the number of comments, etc. Alternatively, the level may be evaluated and determined by the administrator based on reviews about the livestreamer, user satisfaction, and comments posted during the livestream. Alternatively, the level may be automatically determined based on predetermined rules or by a machine learning model.

FIG. 6 is a data structure diagram showing an example of the gift DB 320 of FIG. 3. The gift DB 320 holds information regarding gifts available for the viewers in relation to the livestreaming. A gift is electronic data with the following characteristics:

- It can be purchased in exchange for the points or money, or can be given for free.
- It can be given by a viewer to a livestreamer. Giving a gift to a livestreamer is also referred to as using the gift or throwing the gift.
- Some gifts may be purchased and used at the same time, and some gifts may be used by the viewer at any time after purchased.
- When a viewer gives a gift to a livestreamer, the livestreamer is awarded a corresponding reward.
- When a gift is used, the use may trigger an effect associated with the gift. For example, an effect corresponding to the gift will appear on the livestreaming room screen.

The gift DB 320 stores: a gift ID for identifying a gift; a reward to be awarded, which is a reward awarded to a livestreamer when the gift is given to the livestreamer; and price points, which is the amount of points to be paid for use of the gift, in association with each other. A viewer is able to give a desired gift to a livestreamer by paying the price points of the desired gift while viewing the livestream. The payment of the price points may be made by appropriate electronic payment means. For example, the payment may be made by the viewer paying the price points to the administrator. Alternatively, bank transfers or credit card payments may be available. The administrator can freely determine the relationship between the reward to be awarded and the price points. For example, the administrator may determine that the reward to be awarded=the price points. Alternatively, points obtained by multiplying the reward to be awarded by a predetermined coefficient such as 1.2 may be set as the price points, or points obtained by adding predetermined fee points to the reward to be awarded may be set as the price points.

Referring back to FIG. 3, upon reception of a search request from a user terminal of a user, the search unit 322 refers to the user DB 318 to perform user search and also refers to the stream DB 314 to perform livestream search. The search unit 322 transmits the search results, including the result of the user search and the result of the livestream search, to the user terminal of the requesting user. The search unit 322 includes a search request receiving unit 330, a co-viewer identifying unit 332, a user search unit 334, a livestream search unit 340, an adjusting unit 336, and a providing unit 338.

The search request receiving unit 330 receives a search request from a user terminal of a user of the livestreaming platform over the network NW. The search request includes a user ID of the requesting user and a keyword for the search entered by the user (hereinafter referred to as "the search keyword").

The co-viewer identifying unit 332 refers to the stream DB 314 to identify the co-viewer of the requesting user identified by the user ID included in the search request received by the search request receiving unit 330. The co-viewer identifying unit 332 identifies the user ID of the co-viewer by processing the viewer IDs registered in the stream DB 314 in the following three steps. (Step 1) Stream IDs are extracted from those registered in the stream DB 314 by the following condition: the viewer IDs include the user ID of the requesting user; the view duration of the requesting user is equal to or larger than a predetermined amount of time (e.g., 5 minutes, 10 minutes, 20 minutes, and so on); and the ending time is entered (i.e., the livestream has already been ended). (Step 2) Stream IDs are extracted from those extracted in step 1, by the following condition: the length of the period from the time when the livestream identified by the stream ID was delivered to the present is equal to or less than a threshold value (e.g., one day, one week, one month, and so on). For example, this period starts at the ending time of the livestream and ends at the present. Alternatively, this period may also start at the starting time or intermediate time of the livestream. (Step 3) Viewer IDs are extracted from those associated with the stream IDs extracted in step 2, by the following condition: the view duration is equal to or larger than the same predetermined amount of time as mentioned above. The co-viewer identifying unit 332 identifies the viewer IDs extracted in step 3 as the user IDs of the co-viewers of the requesting user.

Therefore, in the identifying process of the co-viewer identifying unit 332, if the length of the period from the time when the livestream was delivered in the past to the present exceeds the threshold value, this livestream is not used for identification by the co-viewer identifying unit 332. The co-viewer identifying unit 332 finds livestreams that the requesting user has viewed in the past for a predetermined amount of time or more, and identifies, as co-viewers, other users who viewed any of these livestreams for the same predetermined amount of time or more. The predetermined amount of time may be different for the requesting user and for the co-viewers.

The following description is based on the example shown in FIGS. 4 and 5. The predetermined amount of time is 12 minutes, and the threshold value of the period is 24 hours (one day). Suppose that the user "USR4" performs a search on Jun. 21, 2022 at 1:00. As a result of step 1, the co-viewer identifying unit 332 extracts the livestream "ST1". This is because the user "USR4" is included in the viewer IDs of the livestream "ST1", the view duration of the user "USR4" is 15 minutes, which is larger than the predetermined amount of time, and the end time is entered for the livestream "ST1".

As a result of step 2, the co-viewer identifying unit 332 extracts the livestream "ST1". This is because the ending time of the livestream "ST1" is 2022/6/20 5:00, and the length of the period is 20 hours, which is below the threshold value.

As a result of step 3, the co-viewer identifying unit 332 identifies the users "USR3" and "USR5" as co-viewers. The user "USR3" is included in the viewer IDs of the livestream "ST1", and the view duration of the user "USR3" is 13 minutes, which is larger than the predetermined amount of time. The user "USR5" is included in the viewer IDs of the livestream "ST1", the view duration of the user "USR5" is 20 minutes, which is larger than the predetermined amount of time.

The user search unit 334 performs a user search based on the search request received by the search request receiving unit 330. The user search unit 334 searches the user DB 318 using the search keyword as a key, and includes user IDs having a matching score exceeding a predetermined value in the search result. The user search using a search keyword may be realized using known search techniques.

The livestream search unit 340 performs a livestream search based on the search request received by the search request receiving unit 330. The livestream search unit 340 searches the stream DB 314 using the search keyword as a key, and includes livestreams having a matching score exceeding a predetermined value in the search result. The livestream search unit 340 may search only those livestreams registered in the stream DB 314 that do not have the ending time entered, i.e., livestreams that are currently in progress, or the livestream search unit 340 may exclude livestreams having the ending time entered from the search. The livestream search using a search keyword may be realized using known search techniques.

The adjusting unit 336 adjusts the search result of the user search such that the co-viewers of the requesting user are shown in priority to other users who are not co-viewers, at the user terminal of the requesting user. The adjusting unit 336 adjusts the search result of the livestream search such that the livestreams delivered by the co-viewers of the requesting user are shown in priority to livestreams delivered by other users who are not co-viewers, at the user terminal of the requesting user.

For example, in the case where the user search result is sorted in the descending order of matching score, a dedicated position for a co-viewer may be defined, and a co-viewer who is at a position lower than that position may be raised to that position. Specifically, when the dedicated position for a co-viewer is the third position, the co-viewer at the 37th position in the user search result is moved to the third position. The positions of the users who were originally at the third or lower positions are lowered by one.

Alternatively, the positions of co-viewers in the user search result may be raised by a predetermined number (e.g., five). Specifically, in the case where co-viewers A and B are at 24th and 31st positions, respectively, in the user search result, the position of the co-viewer A may be raised by five to 19th position, and the position of the co-viewer B may be also raised by five to 26th position.

The adjusting unit 336 adjusts the search result of the user search such that the positions of the co-viewers in the display of the search result of the user search are higher than the positions of the users taken if these users were not identified by the co-viewer identifying unit 332 (that is, these users were not co-viewers). The adjusting unit 336 performs similar adjustment on the result of the livestream search.

For example, in the search result of the user search, a user is shown at the 37th position if the user is not a co-viewer, and at the third position if the user is a co-viewer.

The user search unit 334, the livestream search unit 340, and the adjusting unit 336 together constitute a generating unit for generating a search result for a search request such that the co-viewers or the livestreams delivered by the co-viewers are presented by priority.

The providing unit 338 provides the adjusted search result to the user terminal of the requesting user over the network NW.

The out-of-livestream UI control unit 402 of the user terminal that has issued the search request generates a search result screen based on the received search result and shows the screen on the display of the user terminal. Once the out-of-livestream UI control unit 402 receives the active user's selection of a livestream on the search result screen, the out-of-livestream UI control unit 402 generates a livestream request including the stream ID of the selected livestream, and transmits the livestream request to the server 10 over the network NW. The livestream information providing unit 302 starts to provide, to the requesting user terminal, the livestream identified by the stream ID included in the received livestream request. The livestream information providing unit 302 updates the stream DB 314 such that the user ID of the active user of the requesting user terminal is included in the viewer IDs associated with the stream ID. In this way, the active user can be a viewer of the selected livestream.

The relay unit 304 relays the video data from the livestreamer-side user terminal 20 to the viewer-side user terminal 30 in the livestream started by the livestream information providing unit 302. The relay unit 304 receives from the viewer-side communication unit 204 a signal that represents user input by a viewer during the livestream, or during reproduction of the video data. The signal that represents user input may be an object specifying signal for specifying an object displayed on the display of the user terminal 30, and the object specifying signal includes the viewer ID of the viewer, the livestreamer ID of the livestreamer delivering the livestream that the viewer watches, and an object ID that identifies the object. When the object is a gift icon, the object ID is a gift ID. The object specifying signal in that case is a gift use signal indicating that the viewer uses a gift for the livestreamer. Similarly, the relay unit 304 receives from the livestreamer-side communication unit 110 of the livestreaming unit 100 in the user terminal 20 a signal that represents user input by the livestreamer during reproduction of the video data, such as the object specifying signal.

The gift processing unit 308 updates the user DB 318 so as to increase the reward for the livestreamer according to the reward to be awarded of the gift identified by the gift ID included in the gift use signal. Specifically, the gift processing unit 308 refers to the gift DB 320 to specify a reward to be awarded for the gift ID included in the received gift use signal. The gift processing unit 308 then updates the user DB 318 to add the specified reward to be awarded to the reward for the livestreamer ID included in the gift use signal.

The payment processing unit 310 processes payment of a price of the gift by the viewer in response to reception of the gift use signal. Specifically, the payment processing unit 310 refers to the gift DB 320 to specify the price points of the gift identified by the gift ID included in the gift use signal. The payment processing unit 310 then updates the user DB 318 to subtract the specified price points from the points of the viewer identified by the viewer ID included in the gift use signal.

Figure 8:
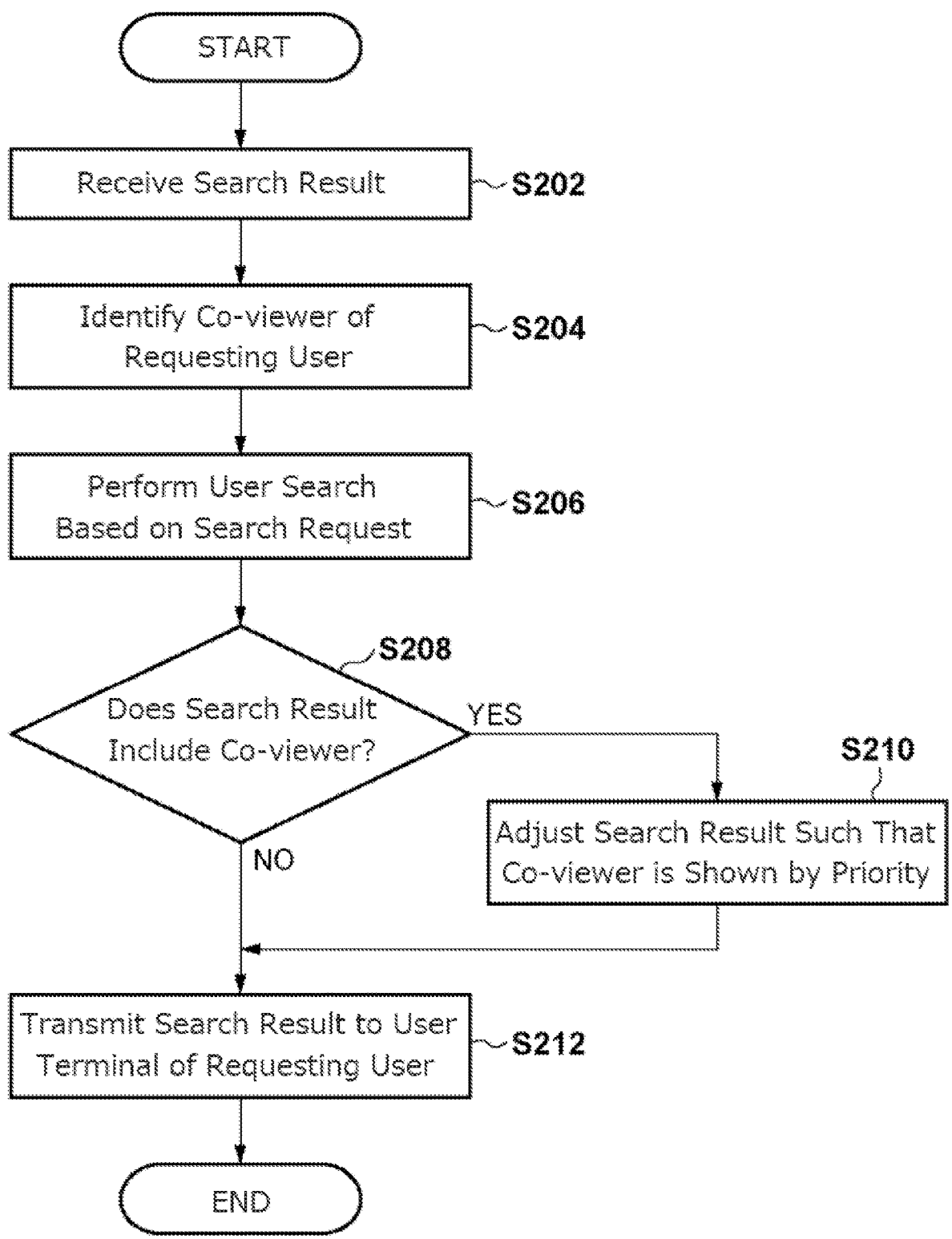
FIG. 8 is a flowchart showing a series of steps related to a user search in the server of FIG. 1.

The operation of the livestreaming system 1 with the above configuration will be now described. FIG. 8 is a flowchart showing a series of steps related to a user search performed in the server 10. The server 10 receives a search request from a user terminal over the network NW (S202). The server 10 refers to the stream DB 314 to identify a co-viewer of the requesting user (S204). The server 10 performs a user search based on the search request (S206). The server 10 determines whether or not the search result of the user search includes the co-viewer identified in step S204 (S208).

If the co-viewer is included (Y in S208), the server 10 adjusts the search result of the user search so that co-viewer is shown by priority (S210). The server 10 transmits the search result adjusted in step S210 to the user terminal of the requesting user over the network NW (S212). If the co-viewer is not included (N in S208), the server 10 transmits the search result of the user search to the user terminal of the requesting user without adjustment (S212). The server 10 performs the same process for the search result of a livestream search.

Figure 9:
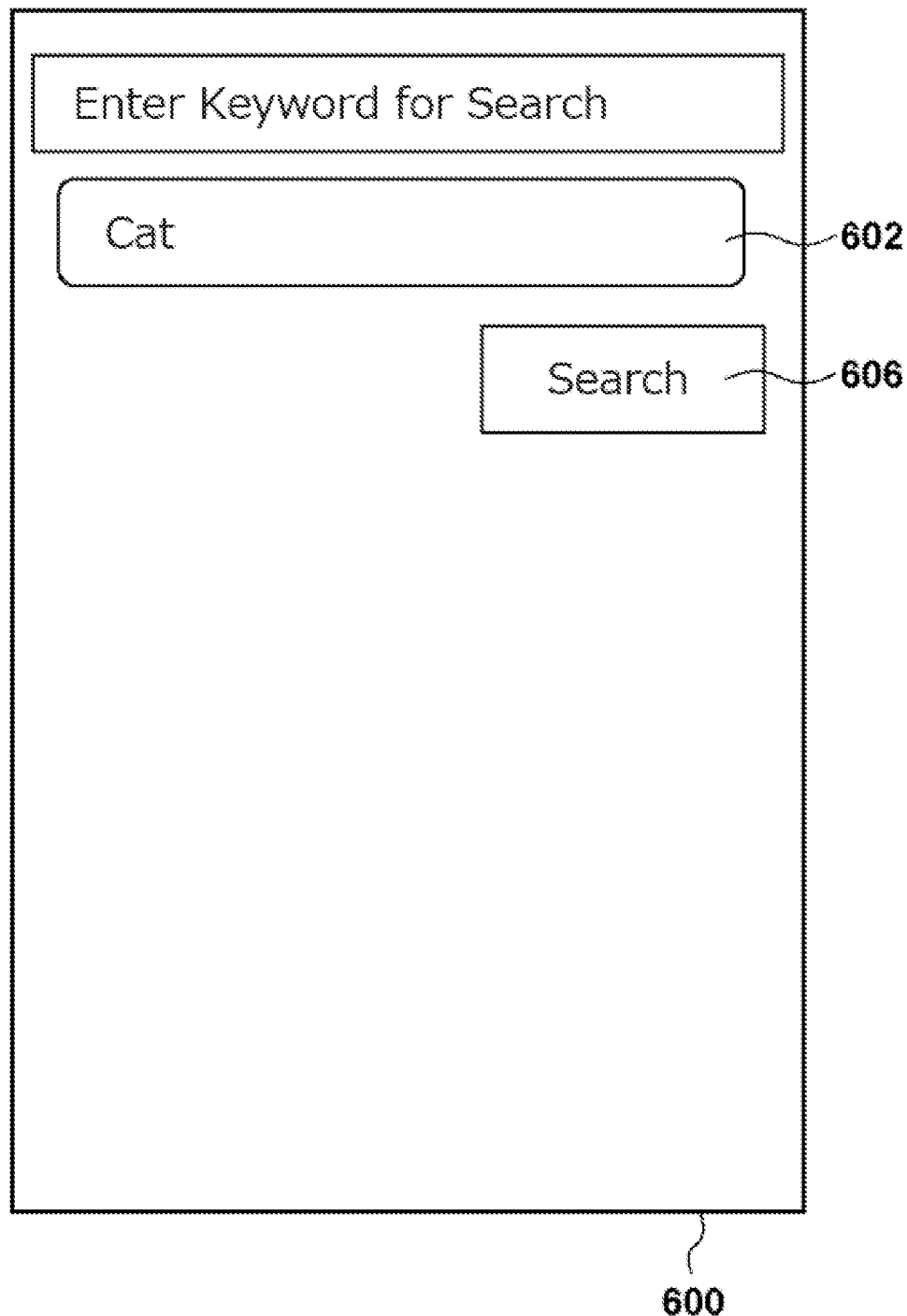
FIG. 9 is a representative screen image of a search receiving screen displayed on the display of an active user's user terminal.

FIG. 9 is a representative screen image of a search receiving screen 600 displayed on the display of the active user's user terminal. The search receiving screen 600 contains a keyword input area 602 for allowing the active user to input a keyword in any manner, and a search button 606.

The active user enters a keyword in the keyword input area 602 and presses the search button 606. On detection of the search button 606 being pressed, the out-of-livestream communication unit 404 of the user terminal generates a search request including the keyword entered in the keyword input area 602 and the user ID of the active user, and transmits it to the server 10 over the network NW.

Figure 10:
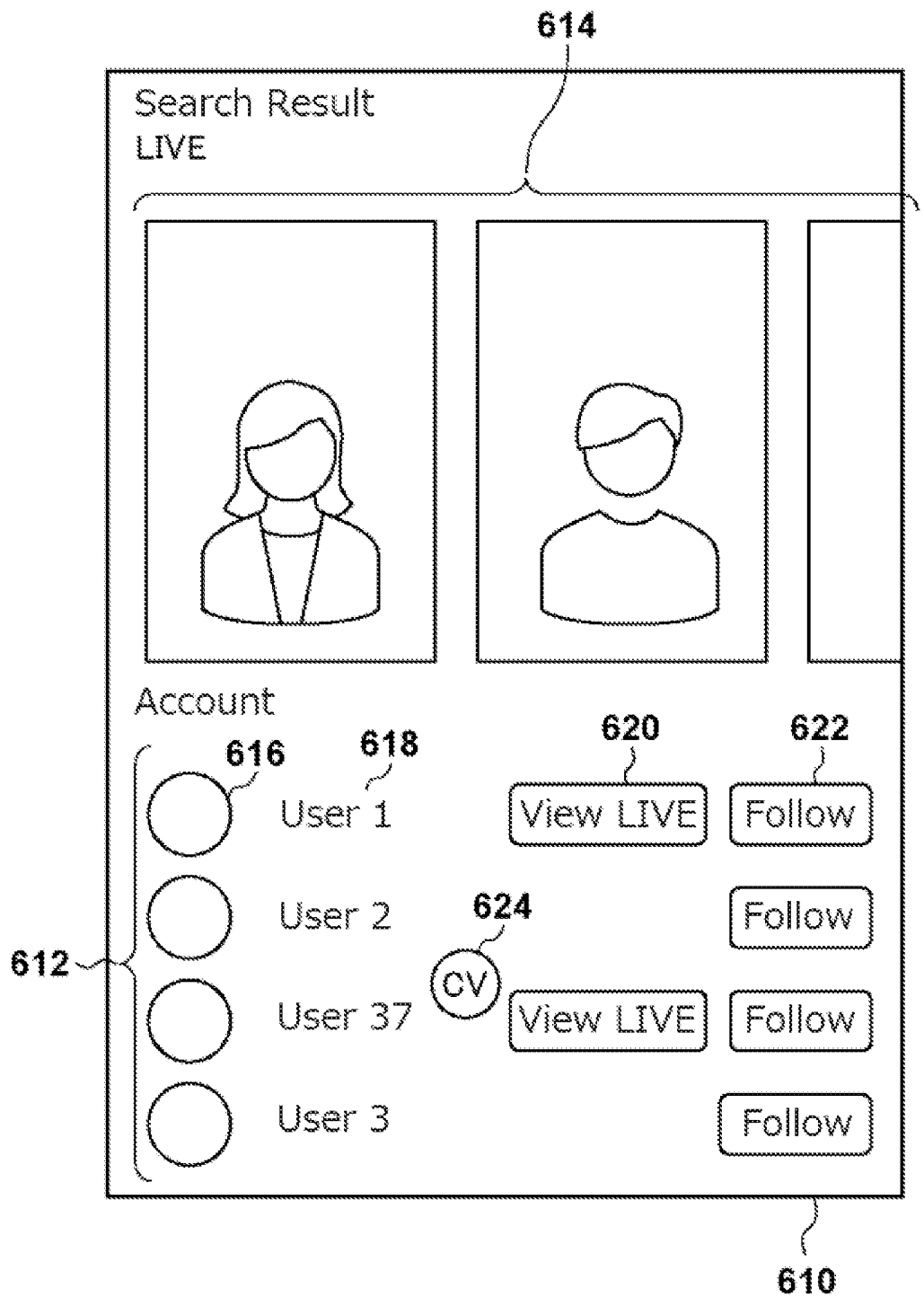
FIG. 10 is a representative screen image of a search result screen displayed on the display of the active user's user terminal.

FIG. 10 is a representative screen image of a search result screen 610 displayed on the display of the active user's user terminal. The out-of-livestream communication unit 404 receives from the server 10 a search result made in response to the search request transmitted via the search receiving screen 600 in FIG. 9. The out-of-livestream UI control unit 402 generates a search result screen 610 based on the received search result and shows the screen on the display. The received search result includes the search result of the user search (referred to as the user search result) and the search result of the livestream search (referred to as the livestream search result). The search result screen 610 contains a user search result display area 612, which displays the user search result, and a livestream search result display area 614, which displays the livestream search result. The livestream search result display area 614 displays the livestream thumbnails arranged in the order of listing in the received livestream search result. Thumbnails that do not fit on the single screen can be displayed by swiping. The user search result display area 612 displays user information items arranged in the order of listing in the received user search result. Items that do not fit on the single screen can be displayed by swiping.

In the user search result display area 612, each of the areas assigned to users contains the user's icon 616, the user's user ID 618, the View Livestream button 620 to enter the user's livestreaming room, and the Follow button 622 to follow the user. For a co-viewer, this area further contains a co-viewer mark 624. The co-viewer mark 624 allows the requesting user to easily understand which of the users displayed in the user search result display area 612 is a co-viewer.

In the above embodiment, the databases are stored on a hard disk or semiconductor memory, for example. It will be understood by those skilled in the art that each element or component can be realized by a CPU not shown, a module of an installed application program, a module of a system program, or a semiconductor memory that temporarily stores the contents of data read from a hard disk, and the like.

According to the livestreaming system 1 related to the embodiment, when a user searches for a livestreamer or a livestream, information on the co-viewer of the user is presented by priority in the search result, so the user can obtain search results that better meet his or her needs. As a result, user satisfaction increases.

Peers who watched the same livestream in the past as the user are likely to have similar interests and tastes or get on well with the user. In the embodiment, such user interaction and exchange are promoted, so as to more efficiently strengthen the connections between people.

In addition, in the livestreaming system 1 related to the embodiment, livestreams after which more than a certain period of time has elapsed are not used to identify co-viewers. Thus, the search result provided matches the current situation of the user performing the search.

In the livestreaming system 1 related to the embodiment, the conditions for identifying a co-viewer includes the condition that both the requesting user and the co-viewer have viewed the same livestream for a predetermined amount of time or more. This improves the accuracy of matching because it allows connection between users who have participated in the same livestream with a certain level of interest. In addition, it is possible to identify co-viewers so as to exclude users who participated in the livestream due to an operational error or users who watched the livestream for a short time and left immediately because the content was not suitable for them. This also improves the accuracy of matching.

Figure 11:
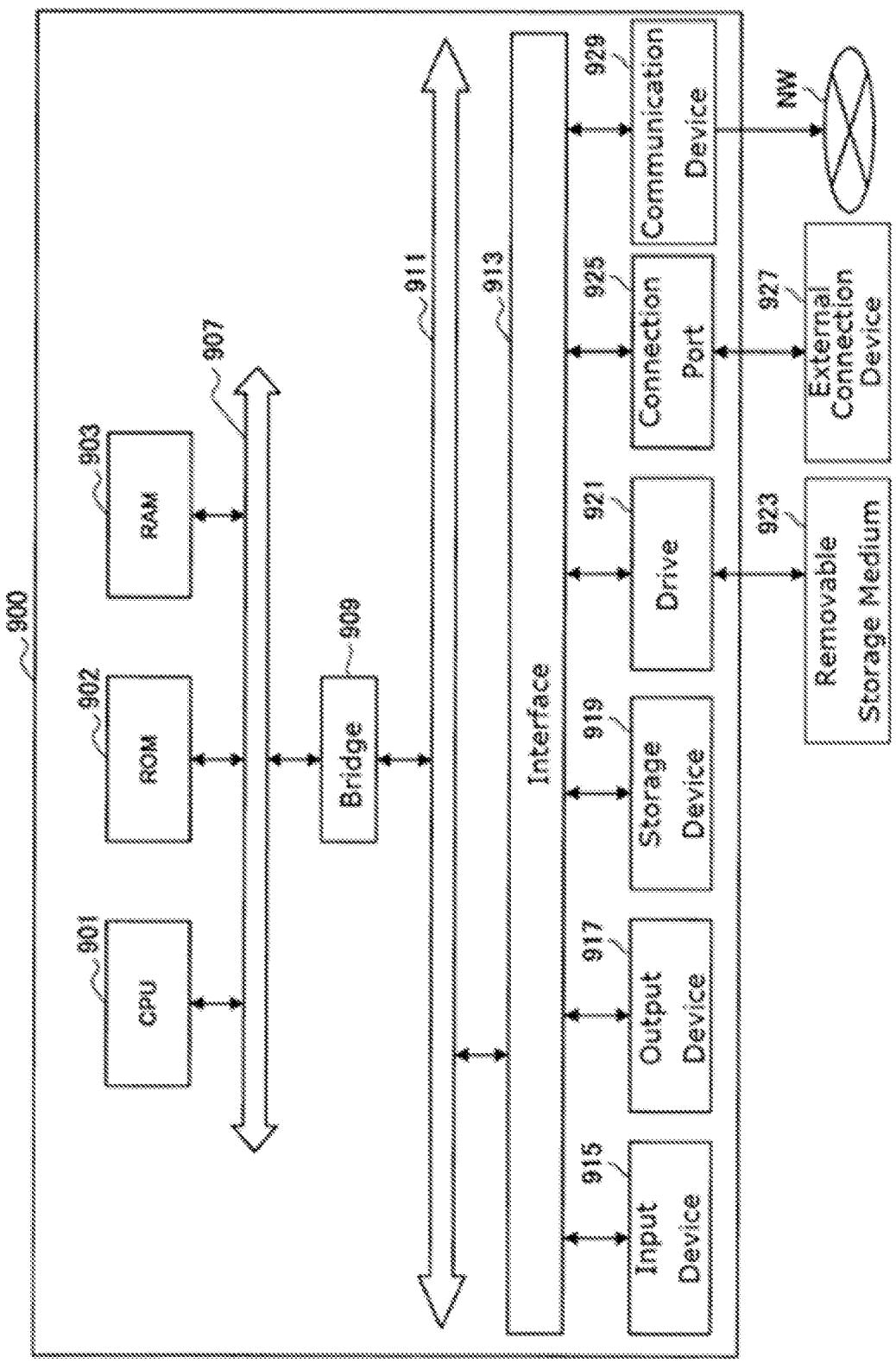
FIG. 11 is a block diagram showing an example of a hardware configuration of an information processing device according to the embodiment.

Referring to FIG. 11, the hardware configuration of an information processing device relating to an embodiment of the disclosure will be now described. FIG. 11 is a block diagram showing an example of the hardware configuration of the information processing device according to the embodiment. The illustrated information processing device 900 may, for example, realize the server 10 and the user terminals 20 and 30 in the embodiment.

The information processing device 900 includes a CPU 901, ROM (Read Only Memory) 902, and RAM (Random Access Memory) 903. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). The CPU 901 is an example of hardware configuration to realize various functions performed by the components described herein. The functions described herein may be realized by circuitry programmed to realize such functions described herein. The circuitry programmed to realize such functions described herein includes a central processing unit (CPU), a digital signal processor (DSP), a general-use processor, a dedicated processor, an integrated circuit, application specific integrated circuits (ASICs) and/or combinations thereof. Various units described herein as being configured to realize specific functions, including but not limited to the livestreaming unit 100, the image capturing control unit 102, the audio control unit 104, the video transmission unit 106, the livestreamer-side UI control unit 108, the livestreamer-side communication unit 110, the viewing unit 200, the viewer-side UI control unit 202, the viewer-side communication unit 204, the out-of-livestream processing unit 400, the out-of-livestream UI control unit 402, the out-of-livestream communication unit 404, the livestream information providing unit 302, the relay unit 304, the gift processing unit 308, the payment processing unit 310, the search unit 322, the search request receiving unit 330, the co-viewer identifying unit 332, the user search unit 334, the livestream search unit 340, the adjusting unit 336, and the providing unit 338 may be embodied as circuitry programmed to realize such functions.

The CPU 901 functions as an arithmetic processing device and a control device, and controls all or some of the operations in the information processing device 900 according to various programs stored in the ROM 902, the RAM 903, the storage device 919, or a removable recording medium 923. For example, the CPU 901 controls the overall operation of each functional unit included in the server 10 and the user terminals 20 and 30 in the embodiment. The ROM 902 stores programs, calculation parameters, and the like used by the CPU 901. The RAM 903 serves as a primary storage that stores a program used in the execution of the CPU 901, parameters that appropriately change in the execution, and the like. The CPU 901, ROM 902, and RAM 903 are interconnected to each other by the host bus 907 which may be an internal bus such as a CPU bus. Further, the host bus 907 is connected to the external bus 911 such as a PCI (Peripheral Component Interconnect/Interface) bus via the bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing device 900 as text, video such as images, or sound such as audio.

The storage device 919 is a device for storing data configured as an example of a storage unit of the information processing device 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for the removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 903. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is, for example, a camera for capturing an image of the real space to generate the captured image. The image capturing device uses an imaging element such as a CCD (Charge Coupled Device) or CMOS (Complementary Metal Oxide Semiconductor) and various elements such as lenses that are provided to control image formation of a subject on the imaging element. The image capturing device may capture a still image or may capture a moving image.

The configuration and operation of the livestreaming system 1 in the embodiment have been described. This embodiment is merely an example, and it will be understood by those skilled in the art that various modifications are possible by combining the respective components and processes, and that such modifications are also within the scope of the present disclosure.

In the embodiment, co-viewers are prioritized in both the search result of the user search and the search result of the livestream search, but this example is not limitative. It is also possible that co-viewers are prioritized in only one of them.

In the embodiment, co-viewers are identified, a user search and a livestream search are performed, and then search results are adjusted to prioritize the co-viewers, but this example is not limitative. For example, the order of identification of the co-viewers and the user search and livestream search may be reversed. Alternatively, it is also possible that a user search is performed first, and for each user included in the search result, the stream DB 314 is referred to to determine whether or not the user is a co-viewer. The same applies to the livestream search. Alternatively, the search algorithm in the user search may be configured such that the matching scores for co-viewers are higher than those for users other than the co-viewers. In this case, parameters of the matching score formula may include a variable that is 1 for co-viewers and 0 for others. The same applies to the livestream search.

In the embodiment, if a co-viewer is included in the search result, the search result is adjusted so that the co-viewer is shown by priority, but this example is not limitative. It is also possible that, for example, the search result of the user search and the co-viewer of the requesting user are obtained separately and combined together to generate the final search result.

The conversion rate from the price points of a gift to a reward to be awarded in the embodiment is merely an example, and the conversion rate may be appropriately set by the administrator of the livestreaming system, for example.

The technical idea according to the embodiment may be applied to live commerce or virtual livestreaming using an avatar that moves in synchronization with the movement of the livestreamer instead of the image of the livestreamer.

The procedures described herein, particularly those described with a flow diagram or a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present invention.

At least some of the functions realized by the server 10 may be realized by a device(s) other than the server 10, for example, the user terminals 20 and 30. At least some of the functions realized by the user terminals 20 and 30 may be realized by a device(s) other than the user terminals 20 and 30, for example, the server 10. For example, the superimposition of a predetermined frame image on an image of the video data performed by the viewer's user terminal may be performed by the server 10 or may be performed by the livestreamer's user terminal. Alternatively, the adjustment of the search result performed at the server 10 may be performed at the requesting user's user terminal. In this case, the server 10 may transmit the search result of the user search, the search result of the livestream search, and a list of co-viewers to the user terminal. When displaying the search results, the user terminal may refer to the list and show the co-viewers or their livestreams by priority.

What is claimed is:

1. A server comprising a circuitry, wherein the circuitry is configured to:
   hold, in a livestream information holding unit, information about livestreamers and viewers of livestreams performed on a livestreaming platform in a past;
   receive, by a request receiving unit, a search request from a user terminal of a first user of the livestreaming platform over a network;
   identify, in an identifying unit, a second user with reference to the livestream information holding unit, the second user being different from the first user and having viewed a livestream that the first user has viewed in a past; and
   generate, in a generating unit, a search result for the search request such that the second user or a livestream performed by the second user is presented by priority.

2. The server of claim 1,
   wherein the circuitry is further configured to perform, by a search unit, a user search based on the search request, and
   wherein the generating unit adjusts the search result of the user search such that the second user is shown in priority to other users on the user terminal of the first user.

3. The server of claim 2,
   wherein the search result of the user search includes a plurality of users including the second user, and
   wherein the generating unit adjusts the search result of the user search such that a position of the second user in display of the search result is higher than a position taken if the second user were not identified by the identifying unit.

4. The server of claim 1, wherein the circuitry is further configured to provide, by a providing unit, the search result to the user terminal of the first user over the network.

5. The server of claim 1, wherein if a length of a period from a time when a livestream was performed in a past to a present exceeds a threshold value, the livestream is not used for identification by the identifying unit.

6. The server of claim 1, wherein the identifying unit finds livestreams that the first user has viewed in a past for a predetermined amount of time or more, and identifies the second user who viewed any of the livestreams for the predetermined amount of time or more.

7. A method performed by a server, the server comprising a circuitry, the circuitry being configured to hold, in a livestream information holding unit, information about livestreamers and viewers of livestreams performed on a livestreaming platform in a past, the method comprising:
   receiving a search request from a user terminal of a first user of the livestreaming platform over a network;
   identifying a second user with reference to the livestream information holding unit, the second user being different from the first user and having viewed a livestream that the first user has viewed in a past; and
   generating a search result for the search request such that the second user or a livestream performed by the second user is presented by priority.

8. A user terminal of a first user of a livestreaming platform, comprising:
   one or more processors; and
   memory storing one or more computer programs configured to be executed by the one or more processors,
   the one or more computer programs including instructions for:
   transmitting a search request to a server over a network;
   receiving a search result for the search request from the server over the network; and
   causing the search result to be displayed on a display of the user terminal such that a second user or a livestream performed by the second user is shown by priority, the second user being different from the first user and having viewed a livestream that the first user has viewed in a past.

* * * * *